US009697137B2

(12) United States Patent
Mukherjee

(10) Patent No.: US 9,697,137 B2
(45) Date of Patent: Jul. 4, 2017

(54) FILTERING TRANSLATION LOOKASIDE BUFFER INVALIDATIONS

(71) Applicant: Cavium, Inc., San Jose, CA (US)

(72) Inventor: Shubhendu Sekhar Mukherjee, Southborough, MA (US)

(73) Assignee: CAVIUM, INC., San Jose, CA (US)

( * ) Notice: Subject to any disclaimer, the term of this patent is extended or adjusted under 35 U.S.C. 154(b) by 162 days.

(21) Appl. No.: 14/541,807

(22) Filed: Nov. 14, 2014

(65) Prior Publication Data

US 2016/0140040 A1 May 19, 2016

(51) Int. Cl.

| | |
|---|---|
| ***G06F 12/00*** | (2006.01) |
| ***G06F 13/00*** | (2006.01) |
| ***G06F 13/28*** | (2006.01) |
| ***G06F 12/1027*** | (2016.01) |
| *G06F 12/1009* | (2016.01) |

(52) U.S. Cl.

CPC ...... *G06F 12/1027* (2013.01); *G06F 12/1009* (2013.01); *G06F 2212/62* (2013.01); *G06F 2212/682* (2013.01); *G06F 2212/683* (2013.01)

(58) Field of Classification Search

CPC ............. G06F 12/1027; G06F 12/1036; G06F 2212/683; G06F 12/1009; G06F 2212/682; G06F 12/1081; G06F 9/30058; G06F 9/3867; G06F 9/45533

USPC .......................................................... 711/135

See application file for complete search history.

(56) References Cited

U.S. PATENT DOCUMENTS 4,779,188 A * 10/1988 Gum .................... G06F 9/4843 711/E12.061
4,980,816 A * 12/1990 Fukuzawa ............ G06F 12/123 711/207
5,437,017 A * 7/1995 Moore ............... G06F 12/1027 709/213
5,497,480 A * 3/1996 Hayes ................ G06F 12/0831 711/166
5,764,944 A * 6/1998 Hwang ............... G06F 12/1027 711/202

(Continued)

OTHER PUBLICATIONS

Agarwal et al., "The MIT Alewife Machine" Proceedings of the IEEE, 87(3): 430-444, 1999.

(Continued)

*Primary Examiner* — Sheng-Jen Tsai
(74) *Attorney, Agent, or Firm* — Occhiuti & Rohlicek LLP

(57) ABSTRACT

A filter includes filter entries, each corresponding to a mapping between a virtual memory address and a physical memory address and including a presence indicator indicative which processing elements have the mapping present in their respective translation lookaside buffers (TLBs). A TLB invalidation (TLBI) instruction is received for a first mapping. If a first filter entry corresponding to the first mapping exists in the filter, the plurality of processing elements are partitioned into a first partition of zero or more processing elements that have the first mapping present in their TLBs and a second partition of zero or more processing elements that do not have the first mapping present in their TLBs based on the presence indicator of the first filter entry. The TLBI instruction is sent to the processing elements included in the first partition, and not those in the second partition.

30 Claims, 9 Drawing Sheets

(56) References Cited

U.S. PATENT DOCUMENTS 5,826,057 A * 10/1998 Okamoto .............. G06F 12/109 703/24
5,890,189 A 3/1999 Nozue et al.
5,893,152 A * 4/1999 Fuller .................. G06F 11/141 711/141
5,906,001 A * 5/1999 Wu .................... G06F 12/1036 711/141
5,956,754 A * 9/1999 Kimmel .............. G06F 12/1036 711/206
6,105,113 A * 8/2000 Schimmel ........... G06F 12/1027 711/144
6,119,204 A 9/2000 Chang et al.
6,212,613 B1 * 4/2001 Belair ................ G06F 12/1027 711/207
6,260,131 B1 * 7/2001 Kikuta ................ G06F 12/1027 711/145
6,370,632 B1 * 4/2002 Kikuta .................... G06F 12/08 345/619
6,453,387 B1 * 9/2002 Lozano ................. G06F 12/127 711/133
6,604,187 B1 * 8/2003 McGrath ............. G06F 12/1036 711/209
6,779,085 B2 * 8/2004 Chauvel .................. G06F 1/206 711/135
7,073,043 B2 7/2006 Arimilli et al.
7,222,221 B1 * 5/2007 Agesen ............... G06F 9/45537 707/999.2
7,617,378 B2 11/2009 Arimilli et al.
7,853,754 B1 12/2010 Agarwal et al.
7,865,670 B2 1/2011 Cota-Robles et al.
8,392,661 B1 3/2013 Metcalf
9,317,443 B2 4/2016 Bybell
9,330,023 B2 5/2016 Bybell
2002/0078308 A1 * 6/2002 Altman ............... G06F 12/1027 711/147
2002/0087614 A1 * 7/2002 Kocev ..................... G06F 13/24 718/104
2004/0215898 A1 * 10/2004 Arimilli .............. G06F 12/1027 711/144
2004/0230749 A1 * 11/2004 Slegel ................. G06F 9/30047 711/144
2005/0080934 A1 * 4/2005 Cota-Robles ....... G06F 12/1036 710/1
2006/0085599 A1 * 4/2006 Woffinden ............ G06F 9/3812 711/125
2006/0230252 A1 10/2006 Dombrowski et al.
2007/0005932 A1 * 1/2007 Covelli ............... G06F 12/1027 711/207
2007/0061547 A1 * 3/2007 Jordan ................ G06F 12/1027 711/207
2007/0061548 A1 * 3/2007 Jordan ................ G06F 12/1027 711/207
2007/0156969 A1 * 7/2007 Tian .................... G06F 12/0848 711/141
2008/0140897 A1 * 6/2008 Ganguly ............. G06F 12/1027 710/268
2010/0100685 A1 * 4/2010 Kurosawa ........... G06F 12/1054 711/128
2010/0332786 A1 12/2010 Grohoski et al.
2010/0332787 A1 12/2010 Grohoski et al.
2011/0153952 A1 * 6/2011 Dixon ................. G06F 12/1009 711/135
2011/0161619 A1 * 6/2011 Kaminski ............ G06F 9/5016 711/207
2011/0161620 A1 * 6/2011 Kaminski ........... G06F 12/1009 711/207
2011/0231593 A1 * 9/2011 Yasufuku ............ G06F 12/1027 711/3
2011/0238947 A1 9/2011 Nishiguchi et al.
2012/0089811 A1 * 4/2012 Sawai ................. G06F 12/1027 711/207
2013/0339656 A1 * 12/2013 Greiner ............... G06F 12/1009 711/207
2013/0339657 A1 * 12/2013 Greiner ............... G06F 9/30043 711/207
2014/0040562 A1 * 2/2014 Koka ...................... G06F 12/10 711/141
2014/0052917 A1 2/2014 Koka et al.
2014/0059320 A1 2/2014 Bennett
2014/0115297 A1 * 4/2014 Cain, III ............. G06F 12/1027 711/207
2014/0189285 A1 * 7/2014 Conrad ............... G06F 12/1027 711/207
2014/0223141 A1 8/2014 Combs
2014/0325167 A1 * 10/2014 Slegel ................. G06F 12/0891 711/159
2015/0058522 A1 * 2/2015 Armstrong .......... G06F 12/1009 711/6
2015/0089116 A1 * 3/2015 Chin ................... G06F 12/1027 711/6
2015/0089147 A1 * 3/2015 Snyder, II ........... G06F 12/0808 711/135
2015/0089150 A1 * 3/2015 Kessler ............... G06F 12/1045 711/139
2015/0089184 A1 * 3/2015 Mukherjee .......... G06F 12/1036 711/206
2015/0100753 A1 * 4/2015 Shen ................... G06F 12/1027 711/207
2015/0242319 A1 * 8/2015 Evans ................. G06F 12/0833 711/207
2015/0301949 A1 * 10/2015 Koka ...................... G06F 12/10 711/147
2015/0301951 A1 10/2015 Bybell
2015/0301953 A1 10/2015 Bybell
2015/0370592 A1 * 12/2015 Tuch ................... G06F 9/45558 718/1
2016/0041922 A1 2/2016 Parks
2016/0140040 A1 * 5/2016 Mukherjee .......... G06F 12/0833 711/135
2016/0140047 A1 * 5/2016 Mukherjee .......... G06F 12/1027 711/207

OTHER PUBLICATIONS

Stevens, A. "Introduction to AMBA® 4 ACE™ and big.Little™ Processing Technology" Copyright 2011-2013, p. 1-15.
Villavieja et al., "DiDi: Mitigating The Performance Impact of TLB Shootdowns Using a Shared TLB Directory".
Ramaswamy, S. "Optimizing Directory-Based Cache Coherence on the RAW Architecture", Massachusetts Institute of Technology, 2005.

* cited by examiner

FILTERING TRANSLATION LOOKASIDE BUFFER INVALIDATIONS

BACKGROUND

This invention relates to management of translation lookaside buffers in computing systems.

Many computing systems utilize virtual memory systems to allow programmers to access memory addresses without having to account for where the memory addresses reside in the physical memory hierarchies of the computing systems. To do so, virtual memory systems maintain a mapping of virtual memory addresses, which are used by the programmer, to physical memory addresses that store the actual data referenced by the virtual memory addresses. The physical memory addresses can reside in any type of storage device (e.g., SRAM, DRAM, magnetic disk, etc.).

When a program accesses a virtual memory address, the virtual memory system performs an address translation to determine which physical memory address is referenced by the virtual memory address. The data stored at the determined physical memory address is read from the physical memory address, as an offset within a memory page, and returned for use by the program. The virtual-to-physical address mappings are stored in a "page table." In some cases, the virtual memory address be located in a page of a large virtual address space that translates to a page of physical memory that is not currently resident in main memory (i.e., a page fault), so that page is then copied into main memory.

Modern computing systems include one or more translation lookaside buffers (TLBs) which are caches for the page table, used by the virtual memory system to improve the speed of virtual to physical memory address translation. Very generally, a TLB includes a number of entries from the page table, each entry including a mapping from a virtual address to a physical address. In general, the entries of the TLB cover only a portion of the total memory available to the computing system. In some examples, the entries of the TLB are maintained such that the portion of the total available memory covered by the TLB includes the most recently accessed, most commonly accessed, or most likely to be accessed portion of the total available memory.

SUMMARY

In one aspect, in general, a method for managing a plurality of translation lookaside buffers, each translation lookaside buffer including a plurality of translation lookaside buffer entries and being associated with a corresponding processing element of a plurality of processing elements, includes: maintaining a filter including a plurality of filter entries, each filter entry corresponding to a mapping between a virtual memory address and a physical memory address and including a presence indicator indicative which processing elements of the plurality of processing elements have the mapping present in their respective translation lookaside buffers; receiving a translation lookaside buffer invalidation instruction for a first mapping between a first virtual memory address and a first physical memory address; determining whether a first filter entry corresponding to the first mapping exists in the filter; if the first filter entry exists in the filter, partitioning the plurality of processing elements into a first partition of zero or more processing elements that have the first mapping present in their translation lookaside buffers and a second partition of zero or more processing elements that do not have the first mapping present in their translation lookaside buffers based on the presence indicator of the first filter entry; sending the translation lookaside buffer invalidation instruction to the processing elements included in the first partition of processing elements; and suppressing sending of the translation lookaside buffer invalidation instruction to the processing elements included in the second partition of processing elements.

Aspects can include one or more of the following features.

The method further includes, if the first filter entry does not exist in the filter, creating the first filter entry corresponding to the first mapping in the filter, sending the translation lookaside buffer invalidation instruction to all of the processing elements of the plurality of processing elements, and setting the presence indicator for the first filter entry to indicate that none of the processing elements of the plurality of processing elements has the first mapping present in the entries of their translation lookaside buffers.

The filter has a capacity of a limited number of filter entries and the method further comprises removing a filter entry from the filter according to a filter entry eviction policy prior to creating the first filter entry.

The filter entry eviction policy includes a least recently used eviction policy.

The method further includes, upon sending the translation lookaside buffer invalidation instruction to the processing elements included in the first partition of processing elements, setting the presence indicator for the first filter entry to indicate that none of the processing elements of the plurality of processing elements has the first mapping present in the entries of their translation lookaside buffers.

None of the processing elements of the plurality of processing elements are included in the first partition of processing elements.

A first translation lookaside buffer entry of a first translation lookaside buffer of a first processing element of the plurality of processing elements includes a second mapping between a second virtual memory address and a second physical memory address and the filter does not include a second filter entry corresponding to the second mapping.

Sending the translation lookaside buffer invalidation instruction to the processing elements included in the first partition of processing elements causes invalidation of a respective translation lookaside buffer entry associated with the first mapping in the translation lookaside buffers of each of the processing elements included in the first partition of processing elements.

The presence indicator of the first filter entry includes a plurality of presence entries, each presence entry corresponding to a different processing element of the plurality of processing elements and being indicative of whether the first mapping is present in the corresponding processing element.

Each entry of the plurality of filter entries includes metadata.

The metadata is received separately from the translation lookaside buffer invalidation instruction.

The metadata includes a block size.

The metadata includes context information.

The context information includes at least one of: a virtual machine identifier (VMID), an address space identifier (ASID), or an exception level (EL).

In another aspect, in general, an apparatus includes: a plurality of processing elements, each associated with a corresponding translation lookaside buffer, each translation lookaside buffer including a plurality of translation lookaside buffer entries; a filter including a plurality of filter entries, each filter entry corresponding to a mapping between a virtual memory address and a physical memory address and including a presence indicator indicative which processing elements of the plurality of processing elements have the mapping present in their respective translation lookaside buffers; and circuitry configured to: receive a translation lookaside buffer invalidation instruction for a first mapping between a first virtual memory address and a first physical memory address; determine whether a first filter entry corresponding to the first mapping exists in the filter; if the first filter entry exists in the filter, partition the plurality of processing elements into a first partition of zero or more processing elements that have the first mapping present in their translation lookaside buffers and a second partition of zero or more processing elements that do not have the first mapping present in their translation lookaside buffers based on the presence indicator of the first filter entry; send the translation lookaside buffer invalidation instruction to the processing elements included in the first partition of processing elements; and suppress sending of the translation lookaside buffer invalidation instruction to the processing elements included in the second partition of processing elements.

Aspects can include one or more of the following features.

The circuitry is further configured to, if the first filter entry does not exist in the filter, create the first filter entry corresponding to the first mapping in the filter, send the translation lookaside buffer invalidation instruction to all of the processing elements of the plurality of processing elements, and set the presence indicator for the first filter entry to indicate that none of the processing elements of the plurality of processing elements has the first mapping present in the entries of their translation lookaside buffers.

The filter has a capacity of a limited number of filter entries and the apparatus further comprises removing a filter entry from the filter according to a filter entry eviction policy prior to creating the first filter entry.

The filter entry eviction policy includes a least recently used eviction policy.

The circuitry is further configured to, upon sending the translation lookaside buffer invalidation instruction to the processing elements included in the first partition of processing elements, setting the presence indicator for the first filter entry to indicate that none of the processing elements of the plurality of processing elements has the first mapping present in the entries of their translation lookaside buffers.

None of the processing elements of the plurality of processing elements are included in the first partition of processing elements.

A first translation lookaside buffer entry of a first translation lookaside buffer of a first processing element of the plurality of processing elements includes a second mapping between a second virtual memory address and a second physical memory address and the filter does not include a second filter entry corresponding to the second mapping.

Sending the translation lookaside buffer invalidation instruction to the processing elements included in the first partition of processing elements causes invalidation of a respective translation lookaside buffer entry associated with the first mapping in the translation lookaside buffers of each of the processing elements included in the first partition of processing elements.

The presence indicator of the first filter entry includes a plurality of presence entries, each presence entry corresponding to a different processing element of the plurality of processing elements and being indicative of whether the first mapping is present in the corresponding processing element.

Each entry of the plurality of filter entries includes metadata.

The metadata is received separately from the translation lookaside buffer invalidation instruction.

The metadata includes a block size.

The metadata includes context information.

The context information at least one of: a virtual machine identifier (VMID), an address space identifier (ASID), or an exception level (EL).

Other features and advantages of the invention will become apparent from the following description, and from the claims.

DESCRIPTION

1 Overview

For a variety of reasons (e.g., a context switch), a mapping between a virtual address and a physical address may become invalid. If the mapping is stored as an entry in a TLB, the entry in the TLB must be invalidated to avoid returning incorrect data to a program that uses the virtual address. In some examples, computing systems provide an instruction for invalidating TLB entries, sometimes referred to as a TLB invalidate instruction (TLBI). When a mapping between a virtual address and a physical address becomes invalid, a TLBI is issued for the mapping. When the TLB receives the TLBI for the mapping, any entry in the TLB corresponding to the mapping is invalidated (or removed).

In some examples, when a mapping between a virtual address and a physical address becomes invalid, a TLBI is issued and sent to the TLB, even if the TLB does not include an entry for the mapping. Sending such unnecessary TLBIs to the TLB can adversely affect performance of the computing system. Furthermore, in computing systems with multiple processing elements (e.g., cores of a multi-core processor), there may be multiple TLBs (i.e., one TLB per processing element) and the adverse effects due to sending unnecessary TLBIs to the processing elements are exacerbated.

Approaches described herein aim to reduce the number of TLBIs that are unnecessarily sent to the processing elements of a computing system, thereby reducing the associated adverse effects of unnecessarily sending TLBIs to the processing elements.

2 Computing System

Figure 1:
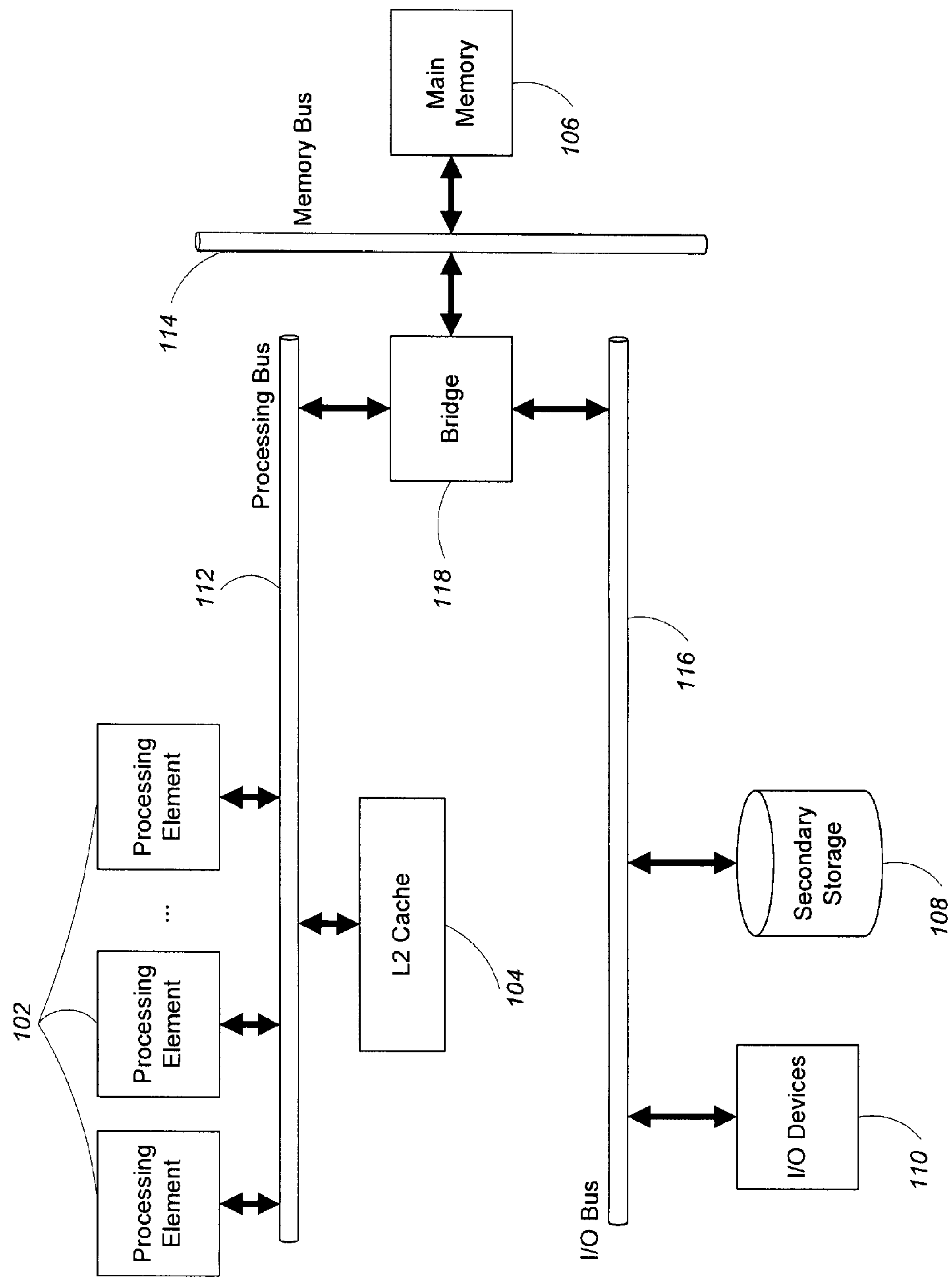
FIG. 1 is a computing system.

Referring to FIG. 1, a computing system 100 includes a number of processing elements 102, a level 2 (L2) cache 104 (e.g., SRAM), a main memory 106 (e.g., DRAM), a secondary storage device (e.g., a magnetic disk) 108, and one or more input/output (I/O) devices 110 (e.g., a keyboard or a mouse). The processing elements 102 and the L2 cache 104 are connected to a processor bus 112, the main memory 106 is connected to a memory bus 114, and the I/O devices 110 and the secondary storage device 108 are connected to an I/O bus 116. The processor bus 112, the memory bus 114, and the I/O bus 116 are connected to one another via a bridge 118.

2.1 Memory Hierarchy

In general, the processing elements 102 execute instructions of one or more computer programs, including reading processor instructions and data from memory included in the computing system 100. As is well known in the art, the various memory or storage devices in the computing system 100 are organized into a memory hierarchy based on a relative latency of the memory or storage devices. One example of such a memory hierarchy has processor registers (not shown) at the top, followed by a level 1 (L1) cache (not shown), followed by the L2 cache 104, followed by the main memory 106, and finally followed by the secondary storage 108. When a given processing element 102 tries to access a memory address, each memory or storage device in the memory hierarchy is checked, in order from the top of the memory hierarchy down, to determine whether the data for the memory address is stored in the storage device or memory device.

For example, for a first processing element of the processing elements 102 to access a memory address for data stored only in the secondary storage device 108, the processing element first determines whether the memory address and data are stored in its L1 cache. Since the memory address and data are not stored in its L1 cache, a cache miss occurs, causing the processor to communicate with the L2 cache 140 via that processor bus 112 to determine whether the memory address and data are stored in the L2 cache 140. Since the memory address and data are not stored in the L2 cache, another cache miss occurs, causing the processor to communicate with the main memory 106 via the processor bus 112, bridge 110, and memory bus 118 to determine whether the memory address and data are stored in the main memory 106. Since the memory address and data are not stored in the main memory 106, another miss occurs (also called a "page fault"), causing the processor to communicate with the secondary storage device 108 via the processor bus, the bridge 118, and the I/O bus 116 to determine whether the memory address and data are stored in the secondary storage device 108. Since the memory address and data are stored in the secondary storage device 108, the data is retrieved from the secondary storage device 108 and is returned to the processing element via the I/O bus 116, the bridge 118, and the processor bus 112. The memory address and data maybe cached in any number of the memory or storage devices in the memory hierarchy such that it can be accessed more readily in the future.

2.2 Processing Elements

Figure 2:
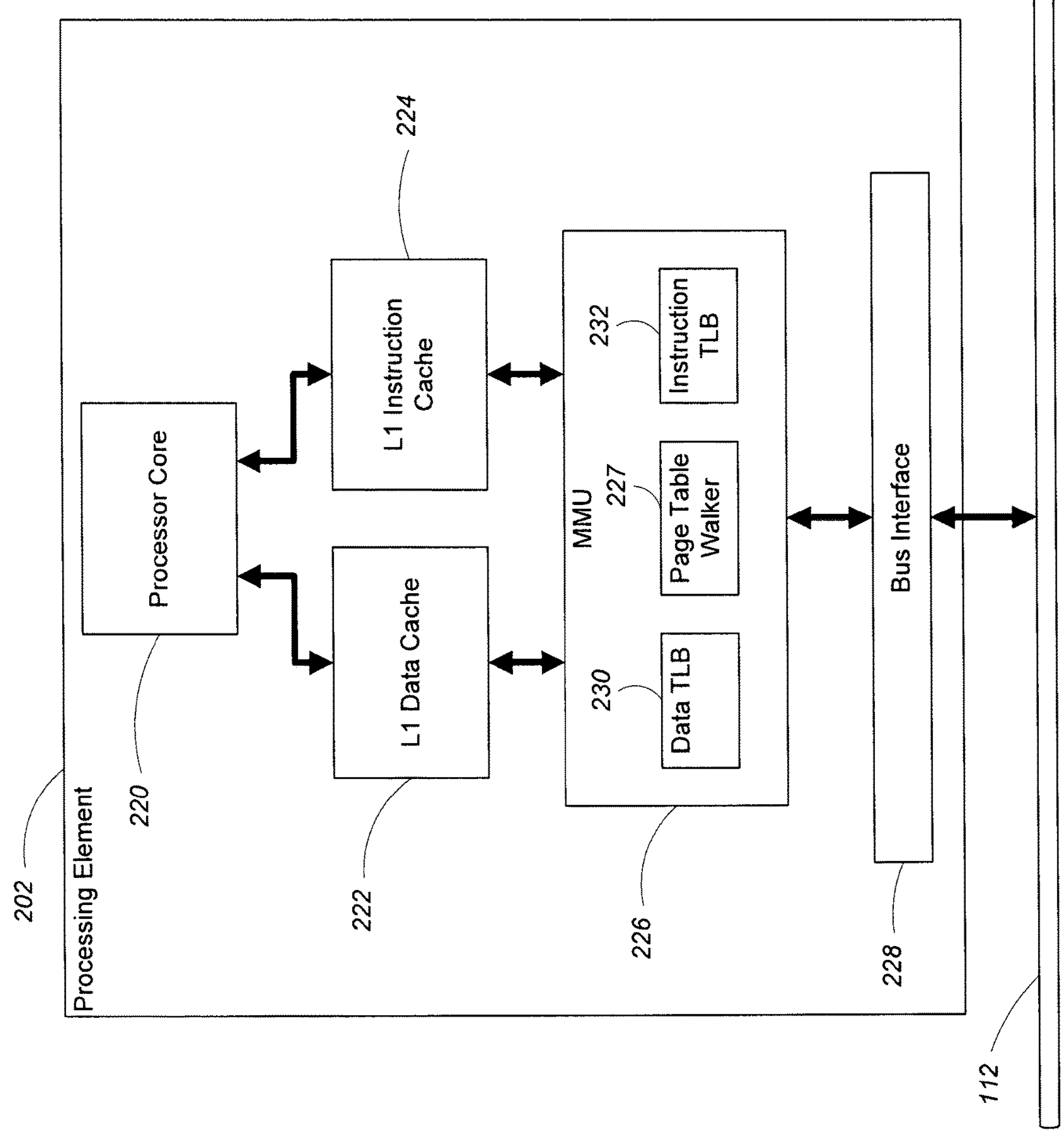
FIG. 2 is a processing element coupled to a processor bus.

Referring to FIG. 2, one example of a processing element 202 of the processing elements 102 of FIG. 1 is connected to the processor bus 112. The processing element 202 includes a processor core 220, an L1 data cache 222, an L1 instruction cache 224, a memory management unit (MMU) 226, and a bus interface 228. The processor core 220 (also called simply a "core") is an individual processor (also called a central processing unit (CPU)) that, together with other processor cores, coordinate to form a multi-core processor. The MMU 226 includes a page table walker 227, a data translation lookaside buffer (TLB) 230, and an instruction translation lookaside buffer (TLB) 232, each of which is described in more detail below. Note that, in some examples, distinction between the data TLB 230 and the instruction TLB 232 is logical and the two TLBs 230, 232 share the same structure or are combined into a single TLB.

Very generally, the processor core 220 executes instructions which, in some cases, require access to memory addresses in the memory hierarchy of the computing system 100. The instructions executed by the processing element 202 of FIG. 2 use virtual memory addresses.

2.2.1 Data Memory Access

When the processor core 220 requires access to a virtual memory address associated with data, the processor core 220 sends a memory access request for the virtual memory address to the L1 data cache 222. The L1 data cache 222 stores a limited number of recently or commonly used data values tagged by their virtual memory addresses. If the L1 data cache 222 has an entry for the virtual memory address (i.e., a cache hit), the data associated with the virtual memory address is returned to the processor core 220 without requiring any further memory access operations in the memory hierarchy. Alternatively, in some implementations, the L1 data cache 222 tags entries by their physical memory addresses, which requires address translation even for cache hits.

If the L1 data cache 222 does not have an entry for the virtual memory address (i.e., a cache miss), the memory access request is sent to the MMU 226. In general, the MMU 226 uses the data TLB 230 to translate the virtual memory address to a corresponding physical memory address and sends a memory access request for the physical memory address out of the processor 202 to other elements of the memory hierarchy via the bus interface 228. The page table walker 227 handles retrieval of mappings that are not stored in the data TLB 230, by accessing the full page table that is stored (potentially hierarchically) in one or more levels of memory. The page table stores a complete set of mappings between virtual memory addresses and physical memory addresses that the page table walker 227 accesses to translate the virtual memory address to a corresponding physical memory address.

To speed up the process of translating the virtual memory address to the physical memory address, the data TLB 230 includes a number of recently or commonly used mappings between virtual memory addresses and physical memory addresses. If the data TLB 230 has a mapping for the virtual memory address, a memory access request for the physical memory address associated with the virtual memory address (as determined from the mapping stored in the data TLB 230) is sent out of the processor 202 via the bus interface 228.

If the data TLB 230 does not have a mapping for the for the virtual memory address (i.e., a TLB miss), the page table walker 227 traverses (or "walks") the levels of the page table to determine the physical memory address associated with the virtual memory address, and a memory request for the physical memory address (as determined from the mapping stored in the page table) is sent out of the processor 202 via the bus interface 228.

In some examples, the data TLB 230 and the page table are accessed in parallel to ensure that no additional time penalty is incurred when a TLB miss occurs.

Since the L1 data cache 222 and the data TLB 230 can only store limited number of entries, cache management algorithms are required to ensure that the entries stored in the L1 data cache 222 and the data TLB 230 are those that are likely to be re-used multiple times. Such algorithms evict and replace entries stored in the L1 data cache 222 and the data TLB 230 based on a criteria such as a least recently used criteria.

2.2.2 Instruction Memory Access

When the processor core 220 requires access to a virtual memory address associated with processor instructions, the processor core 220 sends a memory access request for the virtual memory address to the L1 instruction cache 224. The L1 instruction cache 224 stores a limited number of processor instructions tagged by their virtual memory addresses. If the L1 instruction cache 224 has an entry for the virtual memory address (i.e., a cache hit), the processor instruction associated with the virtual memory address is returned to the processor core 220 without requiring any further memory access operations in the memory hierarchy. Alternatively, in some implementations, the L1 instruction cache 224 tags entries by their physical memory addresses, which requires address translation even for cache hits.

However, if the L1 instruction cache 224 does not have an entry for the virtual memory address (i.e., a cache miss), the memory access request is sent to the MMU 226. In general, the MMU 226 uses the instruction TLB to translate the virtual memory address to a corresponding physical memory address and sends a memory access request for the physical memory address out of the processor 202 to other elements of the memory hierarchy via the bus interface 228. As is noted above, this translation is accomplished using the page table walker 227, which handles retrieval of mappings between virtual memory addresses and physical memory addresses from the page table.

To speed up the process of translating the virtual memory address to the physical memory address, the instruction TLB 232 includes a number of recently or commonly used mappings between virtual memory addresses and physical memory addresses. If the instruction TLB 232 has a mapping for the virtual memory address, a memory access request for the physical memory address associated with the virtual memory address (as determined from the mapping stored in the instruction TLB 232) is sent out of the processor 202 via the bus interface 228.

If the instruction TLB 232 does not have a mapping for the for the virtual memory address (i.e., a TLB miss), the page table walker 227 walks the page table to determine the physical memory address associated with the virtual memory address, and a memory request for the physical memory address (as determined from the mapping stored in the page table) is sent out of the processor 202 via the bus interface 228.

In some examples, the instruction TLB 232 and the page table are accessed in parallel to ensure that no additional time penalty is incurred when a TLB miss occurs.

Since the L1 instruction cache 224 and the instruction TLB 232 can only store a limited number of entries, cache management algorithms are required to ensure that the mappings stored in the L1 instruction cache 224 and the instruction TLB 232 are those that are likely to be re-used multiple times. Such algorithms evict and replace mappings stored in the L1 instruction cache 224 and the instruction TLB 232 based on a criteria such as a least recently used criteria.

2.3 Translation Lookaside Buffer Invalidation (TLBI) Instructions

In some examples, the computing system's virtual memory system may change its mappings between virtual memory addresses and physical memory addresses. In such cases, translation lookaside buffer invalidation instructions (TLBIs) for the virtual memory addresses are issued (e.g., by an operating system or by a hardware entity) to the TLBs in the computing system (i.e., the data TLB 230 and instruction TLB 232 of each processing element 202). In general, a TLBI instruction includes a virtual memory address and causes invalidation of any TLB entries associated with the virtual memory address. That is, when a TLB receives a TLBI for a given virtual memory address, any entries in the TLB storing mappings between the given virtual memory address and a physical memory address are invalidated.

2.4 TLB Directory Cache

Figure 3:
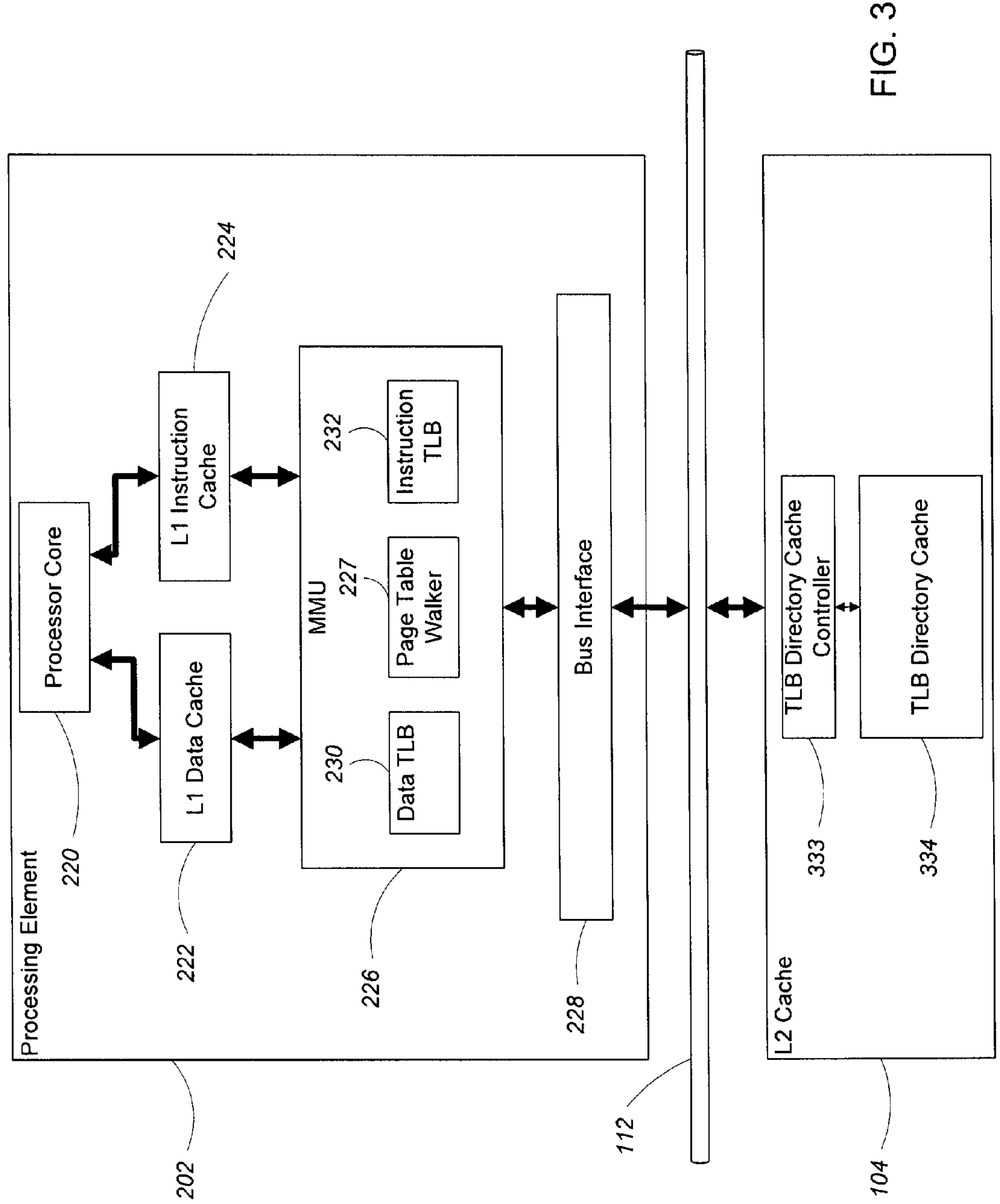
FIG. 3 is a portion of the computer system including a TLB directory cache.

Referring to FIG. 3, in some examples, it is desirable to minimize the number of TLBIs that are sent to the processing elements 202. One way of doing so is to include a filter that stores information for a limited set of mappings, which may be used by processing elements 202 to avoid unnecessary broadcasting of TLBIs to all processing elements 202 in certain situations. An example of such a filter is referred to herein as a TLB directory cache 334, and is implemented in the memory hierarchy (e.g., in the L2 cache 104) of the computing system 100. In general, the TLB directory cache 334 includes a limited number (e.g., 2,500) of entries, each entry being associated with a virtual memory address and indicating which processing elements 202 in the computing system 100 have a mapping between the virtual memory address and a physical memory address in their TLBs. When the virtual memory system of the computing system 100 issues a TLBI for a given virtual memory address, before sending the TLBI to the processing elements 202, a TLB directory cache controller 333 associated with the TLB directory cache 334 consults the TLB directory cache 334 to determine to which, if any, of the processing elements 202 the TLBI should be sent and sends the TLBI to those processing elements 202 only. That is, the TLB directory cache 334, under the control of the TLB directory cache controller 333, is used as a filter, filtering out unnecessary TLBIs.

In some implementations, the TLB directory cache 334 is an 'exclusive' cache in that, if there is an entry in the TLB of a given processing element of the computing system 100, a corresponding entry does not have to exist in the TLB directory cache 334. In such implementations, the TLB directory cache 334 must be able to include entries for mappings indicating that none of the TLBs of the processing elements 202 have entries for the mappings. In other implementations, the TLB directory cache 334 is not necessarily strictly an 'exclusive' cache, but is also not subject to the requirements of an 'inclusive' cache that would require every mapping that exists in any of the TLBs of the processing elements 202 to have a corresponding entry in the TLB directory cache 334.

Figure 4:
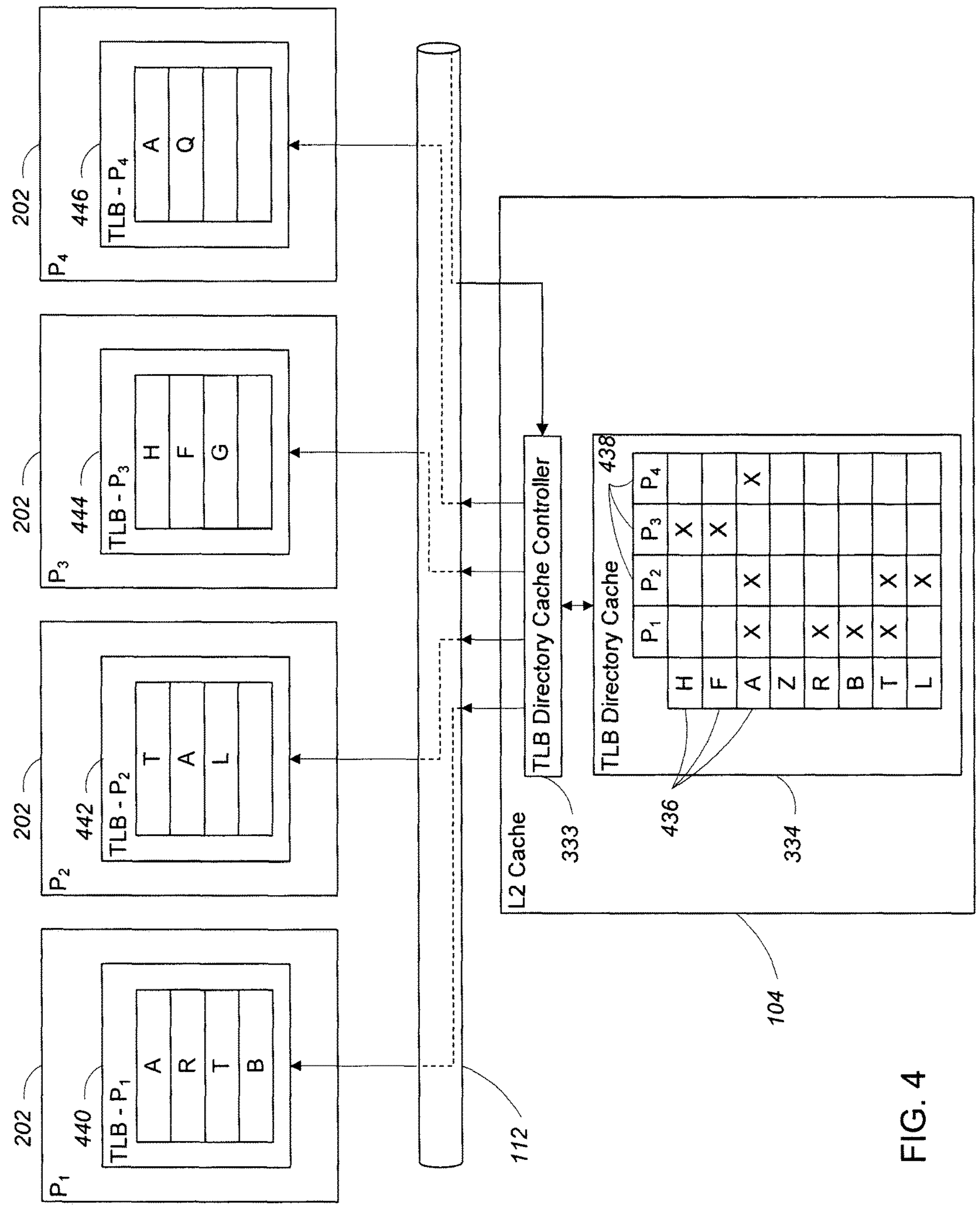
FIG. 4 is a simplified representation of the computing system, including the TLB directory cache.

Referring to FIG. 4, a simplified version 400 of the computing system 100 includes four processing elements 202 (i.e., a first processing element $P_1$, a second processing element, $P_2$, a third processing element $P_3$, and a fourth processing element $P_4$) that are in communication with an L2 cache 104 via a processor bus 112. Each processing element 202 includes a TLB (i.e., $P_1$ includes a first TLB 440, $P_2$ includes a second TLB 442, $P_3$ includes a third TLB 444, and $P_4$ includes a fourth TLB 446). For the sake of simplicity, the four TLBs 440, 442, 444, 446 are generically represented, without specifying whether they are data TLBs or instruction TLBs. This generic representation of the four TLBs is valid since the handling of TLBIs by the TLB directory cache 334 and the TLB directory cache controller 333 is the same regardless of whether the four TLBs are data TLBs or instruction TLBs.

The L2 cache 104 includes a TLB directory cache 334 and a TLB directory cache controller 333. The TLB directory cache controller 333 receives TLBIs (among other instructions) from the processor bus 112 (or from another network) and processes the TLBIs using the TLB directory cache 334 to determine which, if any, processing elements should receive the TLBIs. The TLB directory cache controller 333 sends the TLBIs to those processing elements that it determined should receive the TLBIs via the processor bus 112.

For illustrative purposes, the TLB directory cache 334 is represented as a table including a number of rows 436 and a number of columns 438. Each row in the table represents a different mapping between a virtual memory address and a physical memory address. In some examples, each row is referred to as a 'TLB directory cache entry,' or simply an 'entry.' For the sake of simplicity, individual mappings between virtual memory addresses and physical memory addresses are represented using letters of the alphabet.

In the example of FIG. 4, the TLB directory cache 334 includes eight entries, a first entry for mapping H, a second entry for mapping F, a third entry for mapping A, a fourth entry for mapping Z, a fifth entry for mapping R, a sixth entry for mapping B, a seventh entry for mapping T, and an eighth entry for mapping L. In some examples, the entries in the TLB directory cache 334 include context information such as a virtual machine identifier (VMID), an address space identifier (ASID), or an exception level (EL).

Each column in the table represents a different one of the processing elements 202. In the example of FIG. 4, the TLB directory cache 334 includes four columns: a first column associated with the first processing element $P_1$, a second column associated with the second processing element $P_2$, a third column associated with the third processing element $P_3$, and a fourth column associated with the fourth processing element $P_4$.

A cell at the intersection of each row and column of the TLB directory cache 334 includes an indication as to whether the processing element associated with the column has an entry for the mapping associated with the row stored in its TLB. For example, a row can be stored as a bit vector in a data structure (e.g., a bit map), and each bit in the bit vector can represent presence or absence of a mapping in an entry of a TLB of a corresponding processing element 202. For purposes of illustration, FIG. 4 represents presence of a mapping with an X in a cell.

In the example of FIG. 4, the first entry in the TLB directory cache 334 has an X in its cell associated with the third processing element $P_3$, with the remaining cells in the entry left blank, indicating that the third processing element $P_3$ is the only processing element with an entry for the mapping H stored in its TLB. The second entry in the TLB directory cache 334 has an X in its cell associated with the third processing element $P_3$, with the remaining cells in the entry left blank, indicating that the third processing element $P_3$ is the only processing element with an entry for the mapping F stored in its TLB. The third entry in the TLB directory cache 334 has an X in its cells associated with the first, second, and fourth processing elements $P_1$, $P_2$, and $P_4$, with the cell associated with the third processing element $P_3$ left blank, indicating that only the first, second, and fourth processing elements $P_1$, $P_2$, and $P_3$ have an entry for the mapping A stored in their TLBs.

The fourth entry in the TLB directory cache 334 has all of the cells in the entry left blank, indicating that none of the processing elements 202 has an entry for the mapping Z stored in their TLBs. The fifth entry in the TLB directory cache 334 has an X in its cell associated with the first processing element $P_1$, with the remaining cells in the entry left blank, indicating that the first processing element $P_1$ is the only processing element with an entry for the mapping R stored in its TLB. The sixth entry in the TLB directory cache 334 has an X in its cell associated with the first processing element $P_1$, with the remaining cells in the entry left blank, indicating that the first processing element $P_1$ is the only processing element with an entry for the mapping B stored in its TLB. The seventh entry in the TLB directory cache 334 has an X in its cells associated with the first and second processing elements $P_1$ and $P_2$, with the remaining cells in the entry left blank, indicating that the first and second processing elements $P_1$ and $P_2$ are the only processing elements with entries for the mapping T stored in their TLBs. The eighth entry in the TLB directory cache 334 has an X in its cell associated with the second processing element $P_2$, with the remaining cells in the entry left blank, indicating that the second processing element $P_2$ is the only processing element with an entry for the mapping L stored in its TLB.

Note that the TLBs 440, 442, 444, and 446 associated with the first, second, third, and fourth processing elements include entries consistent with the entries of the TLB directory cache 334. Also note that, since the TLB directory cache 334 is not an inclusive cache, the TLB 446 for the fourth processing element, $P_4$ has an entry for the mapping Q which is not represented in the TLB directory cache 334.

2.4.1 Selective Invalidation

In some examples, when a TLBI for a given mapping between a virtual memory address and a physical memory address is received at the TLB directory cache controller, the TLB directory cache controller may indicate that only a subset of the processing elements have the mapping stored in their TLBs. In such a case, the TLB directory cache controller only sends the TLBI to those processing elements in the subset of processing elements that have the mapping stored in their TLBs.

Figure 5:
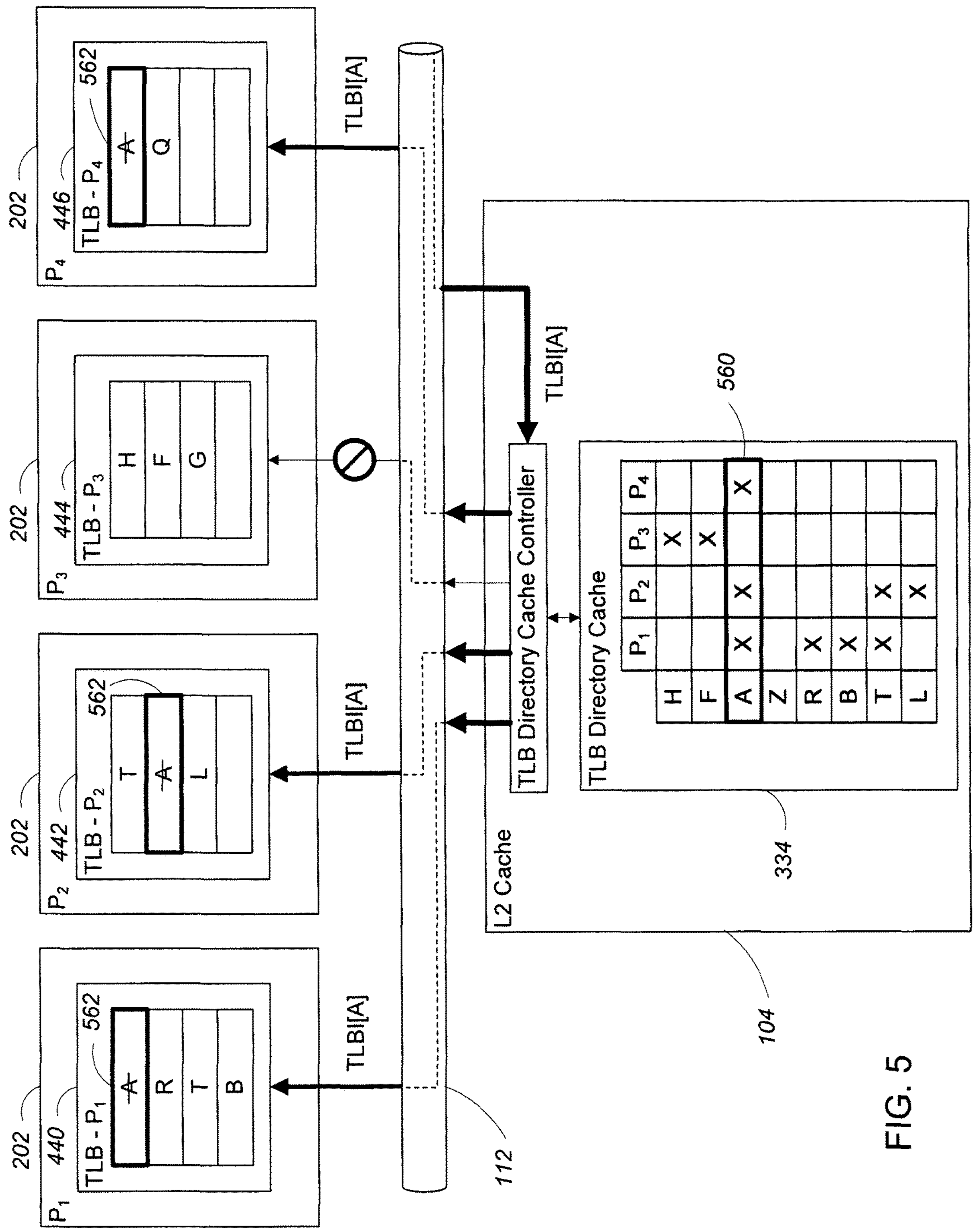
FIG. 5 shows the simplified representation of the computing system performing a selective invalidation using the TLB directory cache.

Referring to FIG. 5, a TLBI for the mapping A is received from the processor bus 112 at the TLB directory cache controller 333. Upon receiving the TLBI for the mapping A, the TLB directory cache controller 333 searches the TLB directory cache 334 to determine whether an entry exists in the TLB directory cache 334 for the mapping A. Since the third row of the TLB directory cache 334 does include an entry 560 for the mapping A, the TLB directory cache controller 333 examines the entry 560 in the third row to determine which, if any, processing elements 202 have the mapping A stored in their TLBs. Based on the entry 560 in the third row of the TLB directory cache 334, the TLB directory cache controller 333 determines that the first processing element $P_1$, the second processing element $P_2$, and the fourth processing element, $P_4$, have the mapping A stored in their TLBs 440, 442, 446.

Having determined that only the first processing element $P_1$, the second processing element $P_2$, and the fourth processing element $P_4$ have the mapping A stored in their TLBs, the TLB directory cache controller 333 only sends the TLBI to the first, second, and fourth processing elements via the processor bus 112. By only sending the TLBI to the first, second, and fourth processing elements, the TLB directory cache controller 333 avoids sending an unnecessary TLBI instruction to the third processing element.

When the TLBs 440, 442, 446 of the first, second, and fourth processing elements receive their respective TLBIs from the TLB directory cache controller 333, they invalidate the entry 562 that they have stored for the mapping A.

2.4.2 TLBI Blocking

In other examples, the TLB directory cache may indicate that none of the processing elements has a given mapping between a virtual memory address and a physical memory address in their TLBs. In such a case, the TLBI is not sent to any of the processing elements.

Figure 6:
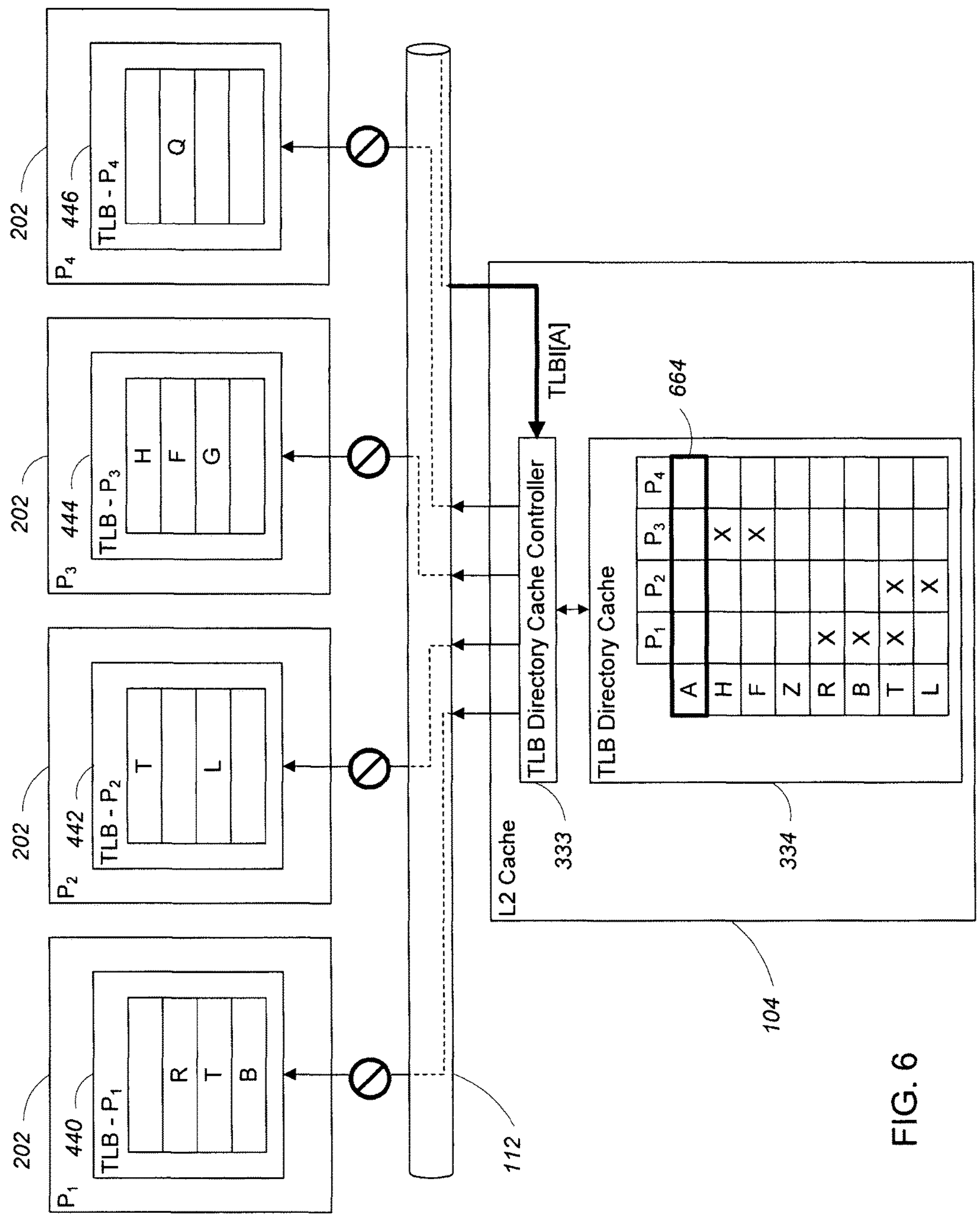
FIG. 6 shows the simplified representation of the computing system blocking sending of TLBI instructions using the TLB directory cache.

Referring to FIG. 6 a TLBI for the mapping A is received from the processor bus 112 at the TLB directory cache controller 333. Upon receiving the TLBI for the mapping A, the TLB directory cache controller 333 searches the TLB directory cache 334 to determine whether an entry exists in the TLB directory cache 334 for the mapping A. The TLB directory cache controller 333 determines that the TLB directory cache 334 does include an entry 664 for the mapping A. Note that, since a TLBI was recently received for the mapping A (i.e., as described in the previous section), the mapping has moved from the third slot in the TLB directory cache table to the first slot, indicating that it is the most recently used entry in the cache. Also note that, since a TLBI was recently received for the mapping A, the entry for mapping A indicates that no processing elements 202 have an entry for mapping A in their TLBs.

Based on the entry 664 in the first row of the TLB directory cache 334, the TLB directory cache controller 333 determines that none of the processing elements 202 have the mapping A stored in their TLBs. Having determined that none of the processing elements 202 have the mapping stored in their TLBs, the TLB directory cache controller 333 doesn't send the TLBI to any of the processing elements 202, thereby preventing unnecessary TLBI instructions from being sent to the processing elements 202.

A similar blocking operation would occur if a TLBI for the mapping Z were received at the TLB directory cache controller 333.

2.4.3 TLB Directory Cache Miss

In yet other examples, the TLB directory cache may not have any information as to which processing elements 202 have a given mapping between a virtual memory address and a physical memory address in their TLBs. In such cases, the TLBI is sent to all of the processing elements 202.

Figure 7:
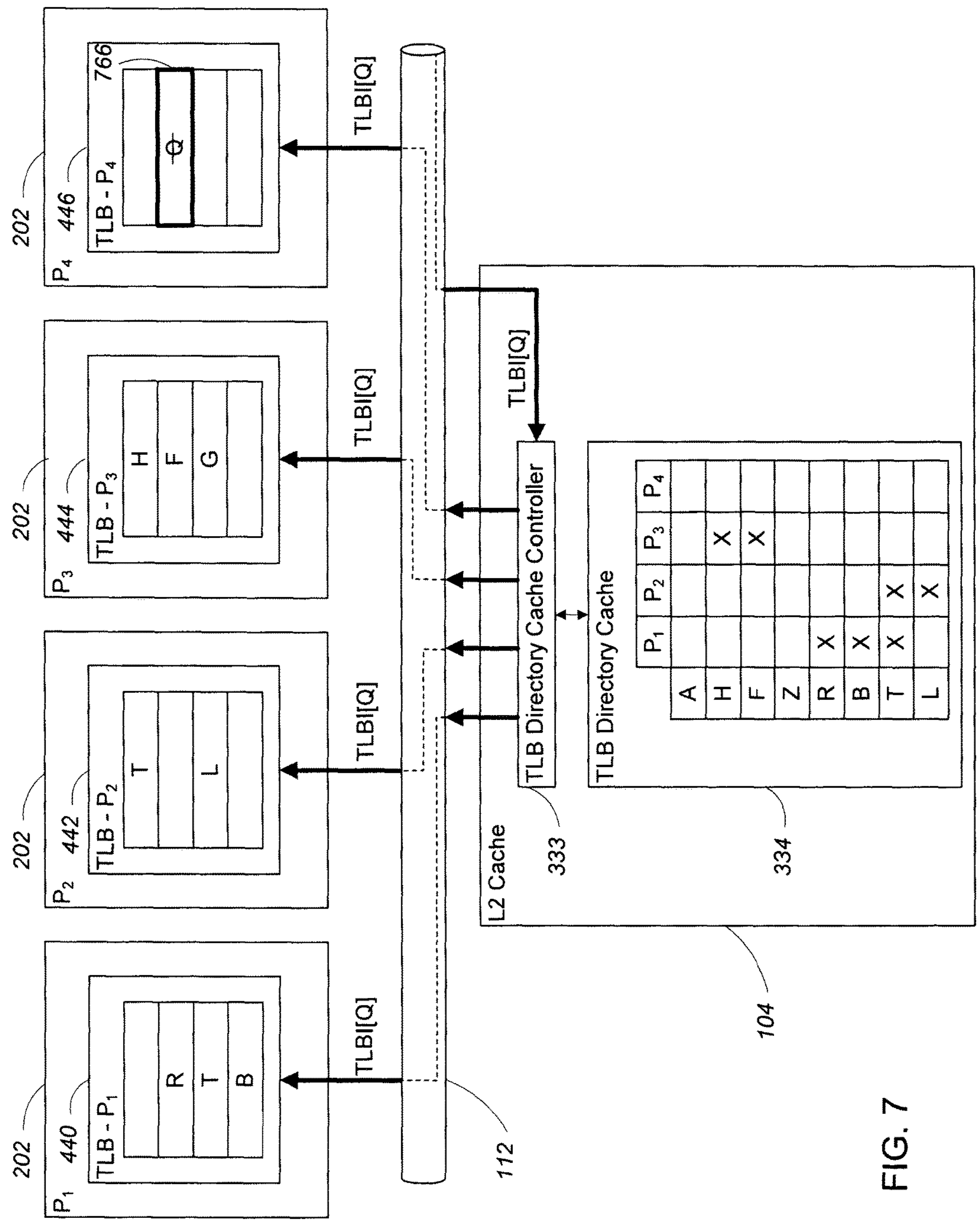
FIG. 7 shows the simplified representation of the computing system broadcasting a TLBI instruction after a TLB directory cache miss.

Referring to FIG. 7, a TLBI for the mapping Q is received from the processor bus 112 at the TLB directory cache controller 333. Upon receiving the TLBI for the mapping Q, the TLB directory cache controller 333 searches the TLB directory cache 334 to determine whether an entry exists in the TLB directory cache 334 for the mapping Q. The TLB directory cache controller 333 determines that no entry exists in the TLB directory cache 334 for the mapping Q. With no entry in the TLB directory cache 334 for the mapping Q, there is no way of determining whether any of the processing elements 202 have the mapping Q stored in their TLBs. For this reason, the TLB directory cache controller 333 sends the TLBI to all of the processing elements 202, via the processor bus 112.

Note that, since the fourth processing element $P_4$ happens to have the mapping Q stored as en entry 766 in its TLB 446, the mapping Q stored in its TLB 446 is invalidated by the TLBI. Since none of the other processing elements 202 have the mapping Q stored in their TLBs 440, 442, 444, no mappings are invalidated in their TLBs 440, 442, 444 by the TLBI.

2.4.4 TLB Directory Cache Entry Addition and Eviction

Figure 8:
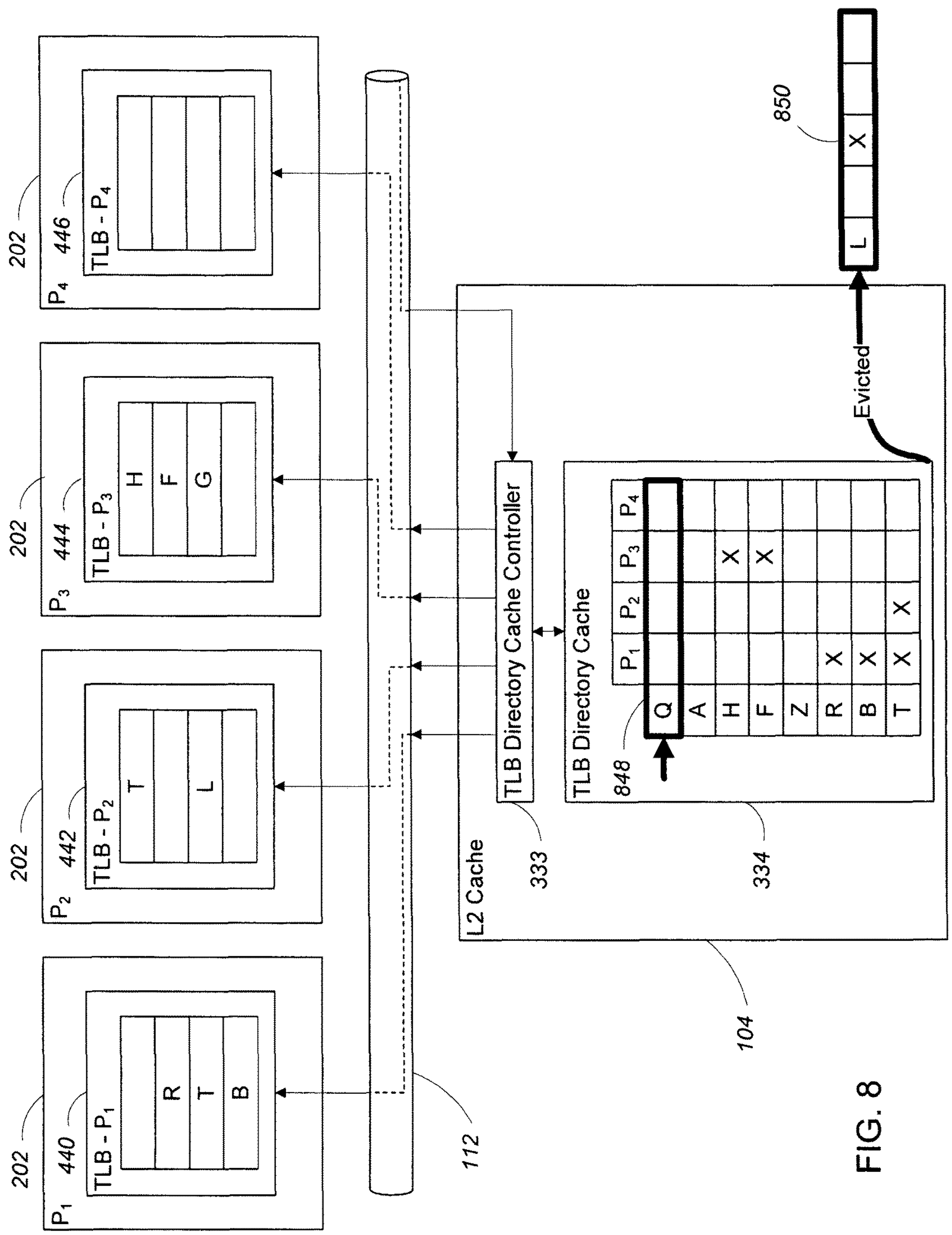
FIG. 8 shows the simplified representation of the computing system performing a TLB directory cache management procedure.

Referring to FIG. 8, after the TLBI for the mapping Q is sent to all of the processing elements 202, a new entry 848 for the mapping Q is created in the TLB directory cache 334. Since the TLBI for the mapping Q was just sent to all of the processing elements 202, the entry 848 for the mapping Q indicates that none of the processing elements 202 have the mapping Q stored in their TLBs 440, 442, 444, 446 (i.e., the cells for the new entry 848 are all blank). In some examples, the new entry is created using context information, block size, and other metadata information that is related to the mapping Q. In some examples, the context information, block size, and other metadata information is received at the TLB directory cache in a separate transaction from the processing element.

As was noted earlier, the TLB directory cache 334 can only store a limited number of entries. For this reason, before the new entry 848 for the mapping Q is added to the TLB directory cache 334, another entry must be evicted from the TLB directory cache 334 to make room for the new entry 848. In FIG. 8, the entry 850 for the mapping L is evicted.

Note that, in FIG. 8, the new entry 848 for the mapping Q is added to the top of the TLB directory cache 334 table and the entry 850 for the mapping L, which is evicted, is at the bottom of the TLB directory cache 334 table. This way of managing entries in the TLB directory cache 334 is consistent with a least recently used cache management algorithm, where the most recently used entries are at the top of the cache and the least recently used entries are at the bottom of the cache. When a new entry is added to the top of the cache, the entry at the bottom of the cache, which is the least recently used entry, is evicted from the cache to make room for the new entry. Of course, many other cache management algorithms can be used to manage the TLB directory cache 334.

2.4.5 TLB Directory Cache Entry Management

Figure 9:
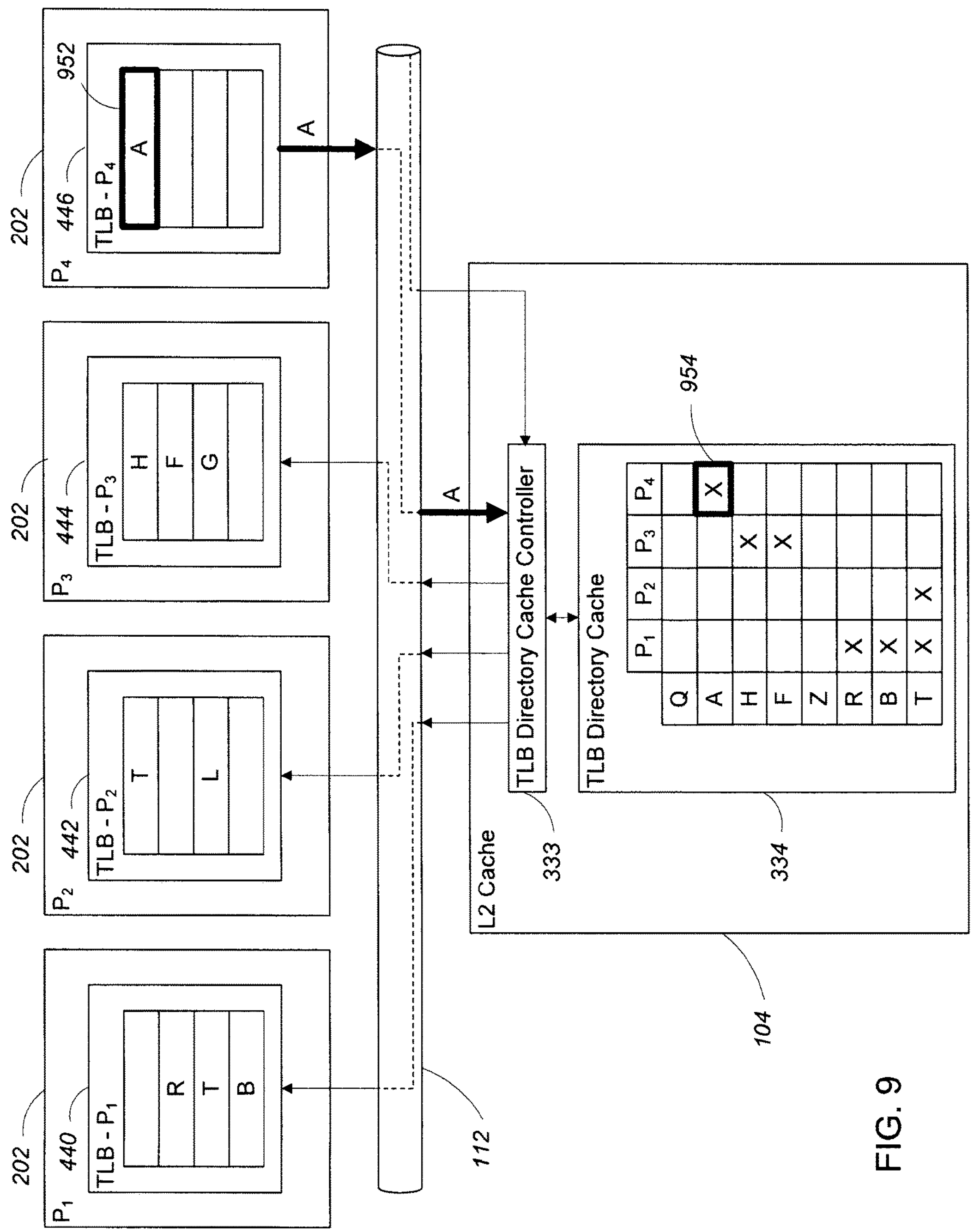
FIG. 9 shows the simplified representation of the computing system performing a TLB directory cache entry management procedure.

Referring to FIG. 9, a new entry 952 has been created for the mapping A between a virtual memory address and a physical memory address in the TLB 446 of the fourth processing element $P_4$. To generate the new entry in the TLB 466, the MMU (not shown) issues a read request for the physical address associated with the mapping A. The virtual address associated with the mapping A is also sent with the read request issued by the MMU. The read request is sent through TLB directory cache controller 333 which processes the read request and determines that the fourth processing element $P_4$ has issued a read request related to the mapping A.

The TLB directory cache controller 333 searches the TLB directory cache 334 to determine whether the TLB directory cache 334 has an entry for the mapping A. In the example of FIG. 9, the TLB directory cache 334 does have an entry for the mapping A (i.e., in the second row). Having determined that the TLB directory cache 334 has an entry for the mapping A, the TLB directory cache controller 333 updates the entry for the mapping A to indicate that the TLB 446 for the fourth processing element $P_4$ has an entry for the mapping A (shown in the figure as marking the cell associated with the mapping A and the fourth processing element $P_4$ with an X 954). By updating the TLB directory cache 334 whenever the TLBs of the processing elements 202 are updated, the TLB directory cache 334 is guaranteed to be correct.

3 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Other embodiments are within the scope of the following claims.

What is claimed is:

1. A method for managing a plurality of translation lookaside buffers, each translation lookaside buffer including a plurality of translation lookaside buffer entries from a page table stored in physical memory, and each translation lookaside buffer being associated with a corresponding processing element of a plurality of processing elements, the method comprising:

maintaining a filter separate from the page table and separate from any of the translation lookaside buffers, the filter including a plurality of filter entries, each filter entry corresponding to a mapping between a virtual memory address and a physical memory address and including a presence indicator indicative which processing elements of the plurality of processing elements have the mapping present in their respective translation lookaside buffers;

receiving a translation lookaside buffer invalidation instruction for a first mapping between a first virtual memory address and a first physical memory address;

determining whether a first filter entry corresponding to the first mapping exists in the filter in response to receiving the translation lookaside buffer invalidation instruction;

if the first filter entry exists in the filter, partitioning the plurality of processing elements into a first partition of zero or more processing elements that have the first mapping present in their translation lookaside buffers and a second partition of zero or more processing elements that do not have the first mapping present in their translation lookaside buffers based on the presence indicator of the first filter entry;

sending the translation lookaside buffer invalidation instruction to the processing elements included in the first partition of processing elements; and suppressing sending of the translation lookaside buffer invalidation instruction to the processing elements included in the second partition of processing elements.

2. The method of claim 1 further comprising, if the first filter entry does not exist in the filter, creating the first filter entry corresponding to the first mapping in the filter, sending the translation lookaside buffer invalidation instruction to all of the processing elements of the plurality of processing elements, and setting the presence indicator for the first filter entry to indicate that none of the processing elements of the plurality of processing elements has the first mapping present in the entries of their translation lookaside buffers.

3. The method of claim 2 wherein the filter has a capacity of a limited number of filter entries and the method further comprises removing a filter entry from the filter according to a filter entry eviction policy prior to creating the first filter entry.

4. The method of claim 3 wherein the filter entry eviction policy includes a least recently used eviction policy.

5. The method of claim 1 further comprising, upon sending the translation lookaside buffer invalidation instruction to the processing elements included in the first partition of processing elements, setting the presence indicator for the first filter entry to indicate that none of the processing elements of the plurality of processing elements has the first mapping present in the entries of their translation lookaside buffers.

6. The method of claim 1 wherein none of the processing elements of the plurality of processing elements are included in the first partition of processing elements.

7. The method of claim 1 wherein a first translation lookaside buffer entry of a first translation lookaside buffer of a first processing element of the plurality of processing elements includes a second mapping between a second virtual memory address and a second physical memory address and the filter does not include a second filter entry corresponding to the second mapping.

8. The method of claim 1 wherein sending the translation lookaside buffer invalidation instruction to the processing elements included in the first partition of processing elements causes invalidation of a respective translation lookaside buffer entry associated with the first mapping in the translation lookaside buffers of each of the processing elements included in the first partition of processing elements.

9. The method of claim 1 wherein the presence indicator of the first filter entry includes a plurality of presence entries, each presence entry corresponding to a different processing element of the plurality of processing elements and being indicative of whether the first mapping is present in the corresponding processing element.

10. The method of claim 1 wherein each entry of the plurality of filter entries includes metadata.

11. The method of claim 10 wherein the metadata is received separately from the translation lookaside buffer invalidation instruction.

12. The method of claim 10 wherein the metadata includes a block size.

13. The method of claim 10 wherein the metadata includes context information.

14. The method of claim 13 wherein the context information includes at least one of: a virtual machine identifier (VMID), an address space identifier (ASID), or an exception level (EL).

15. An apparatus comprising:

physical memory storing a page table;

a plurality of processing elements, each associated with a corresponding translation lookaside buffer, each translation lookaside buffer including a plurality of translation lookaside buffer entries from the page table;

a filter separate from the page table and separate from any of the translation lookaside buffers, the filter including a plurality of filter entries, each filter entry corresponding to a mapping between a virtual memory address and a physical memory address and including a presence indicator indicative which processing elements of the plurality of processing elements have the mapping present in their respective translation lookaside buffers; and circuitry configured to:

receive a translation lookaside buffer invalidation instruction for a first mapping between a first virtual memory address and a first physical memory address;

determine whether a first filter entry corresponding to the first mapping exists in the filter in response to receiving the translation lookaside buffer invalidation instruction;

if the first filter entry exists in the filter, partition the plurality of processing elements into a first partition of zero or more processing elements that have the first mapping present in their translation lookaside buffers and a second partition of zero or more processing elements that do not have the first mapping present in their translation lookaside buffers based on the presence indicator of the first filter entry;

send the translation lookaside buffer invalidation instruction to the processing elements included in the first partition of processing elements; and suppress sending of the translation lookaside buffer invalidation instruction to the processing elements included in the second partition of processing elements.

16. The apparatus of claim 15 wherein the circuitry is further configured to, if the first filter entry does not exist in the filter, create the first filter entry corresponding to the first mapping in the filter, send the translation lookaside buffer invalidation instruction to all of the processing elements of the plurality of processing elements, and set the presence indicator for the first filter entry to indicate that none of the processing elements of the plurality of processing elements has the first mapping present in the entries of their translation lookaside buffers.

17. The apparatus of claim 16 wherein the filter has a capacity of a limited number of filter entries and the apparatus further comprises removing a filter entry from the filter according to a filter entry eviction policy prior to creating the first filter entry.

18. The apparatus of claim 17 wherein the filter entry eviction policy includes a least recently used eviction policy.

19. The apparatus of claim 15 wherein the circuitry is further configured to, upon sending the translation lookaside buffer invalidation instruction to the processing elements included in the first partition of processing elements, setting the presence indicator for the first filter entry to indicate that none of the processing elements of the plurality of processing elements has the first mapping present in the entries of their translation lookaside buffers.

20. The apparatus of claim 15 wherein none of the processing elements of the plurality of processing elements are included in the first partition of processing elements.

21. The apparatus of claim 15 wherein a first translation lookaside buffer entry of a first translation lookaside buffer of a first processing element of the plurality of processing elements includes a second mapping between a second virtual memory address and a second physical memory address and the filter does not include a second filter entry corresponding to the second mapping.

22. The apparatus of claim 15 wherein sending the translation lookaside buffer invalidation instruction to the processing elements included in the first partition of processing elements causes invalidation of a respective translation lookaside buffer entry associated with the first mapping in the translation lookaside buffers of each of the processing elements included in the first partition of processing elements.

23. The apparatus of claim 15 wherein the presence indicator of the first filter entry includes a plurality of presence entries, each presence entry corresponding to a different processing element of the plurality of processing elements and being indicative of whether the first mapping is present in the corresponding processing element.

24. The apparatus of claim 15 wherein each entry of the plurality of filter entries includes metadata.

25. The apparatus of claim 24 wherein the metadata is received separately from the translation lookaside buffer invalidation instruction.

26. The apparatus of claim 24 wherein the metadata includes a block size.

27. The apparatus of claim 24 wherein the metadata includes context information.

28. The apparatus of claim 27 wherein the context information at least one of: a virtual machine identifier (VMID), an address space identifier (ASID), or an exception level (EL).

29. A method for managing a plurality of translation lookaside buffers, each translation lookaside buffer including a plurality of translation lookaside buffer entries from a page table stored in physical memory, and each translation lookaside buffer being associated with a corresponding processing element of a plurality of processing elements, the method comprising:

maintaining a filter separate from the page table and separate from any of the translation lookaside buffers, the filter including a plurality of filter entries, each filter entry corresponding to a mapping between a virtual memory address and a physical memory address and including a presence indicator indicative which processing elements of the plurality of processing elements have the mapping present in their respective translation lookaside buffers;

receiving a translation lookaside buffer invalidation instruction for a first mapping between a first virtual memory address and a first physical memory address;

determining whether a first filter entry corresponding to the first mapping exists in the filter in response to receiving the translation lookaside buffer invalidation instruction; and if the first filter entry exists in the filter, sending the translation lookaside buffer invalidation instruction only to any processing elements that have the first mapping present in their translation lookaside buffers, based on the presence indicator of the first filter entry; or if the first filter entry does not exist in the filter, creating the first filter entry corresponding to the first mapping in the filter, sending the translation lookaside buffer invalidation instruction to all of the processing elements of the plurality of processing elements, and setting the presence indicator for the first filter entry to indicate that none of the processing elements of the plurality of processing elements has the first mapping present in the entries of their translation lookaside buffers.

30. A method for managing a plurality of translation lookaside buffers, each translation lookaside buffer including a plurality of translation lookaside buffer entries from a page table stored in physical memory, and each translation lookaside buffer being associated with a corresponding processing element of a plurality of processing elements, the method comprising:

maintaining a filter separate from the page table and separate from any of the translation lookaside buffers, the filter including a plurality of filter entries, each filter entry corresponding to a mapping between a virtual memory address and a physical memory address and including a presence indicator indicative which processing elements of the plurality of processing elements have the mapping present in their respective translation lookaside buffers;

receiving a first translation lookaside buffer invalidation instruction for a first mapping between a first virtual memory address and a first physical memory address;

after receiving the first translation lookaside buffer invalidation instruction, creating a first filter entry corresponding to the first mapping in the filter, sending the translation lookaside buffer invalidation instruction to all of the processing elements of the plurality of processing elements, and setting the presence indicator for the first filter entry to indicate that none of the processing elements of the plurality of processing elements has the first mapping present in the entries of their translation lookaside buffers;

updating the presence indicators for the filter entries based on which processing elements of the plurality of processing elements add particular mappings into their respective translation lookaside buffers;

receiving a second translation lookaside buffer invalidation instruction for the first mapping between the first virtual memory address and the first physical memory address;

in response to receiving the second translation lookaside buffer invalidation instruction, sending the translation lookaside buffer invalidation instruction only to any processing elements that have the first mapping present in their translation lookaside buffers, based on the presence indicator of the first filter entry.

* * * * *